United States Patent
Al-Banna

(10) Patent No.: US 9,160,576 B1
(45) Date of Patent: Oct. 13, 2015

(54) CONDITIONAL USE OF FEEDBACK EQUALIZATION

(71) Applicant: ARRIS Enterprises, Inc., Suwanee, GA (US)

(72) Inventor: Ayham Al-Banna, Orland Park, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/247,921

(22) Filed: Apr. 8, 2014

(51) Int. Cl.
*H03H 7/30* (2006.01)
*H04L 25/03* (2006.01)

(52) U.S. Cl.
CPC .............................. *H04L 25/03057* (2013.01)

(58) Field of Classification Search
CPC ............... H04L 25/03038; H04L 25/03057; H04L 2025/03617; H04L 2025/03477; H04L 2025/0349; H04L 2025/03503; H03H 21/0012
USPC ........................................................ 375/231
See application file for complete search history.

(56) References Cited

U.S. PATENT DOCUMENTS

| | | | |
|---|---|---|---|
| 5,666,170 A * | 9/1997 | Stewart | 348/726 |
| 5,805,619 A * | 9/1998 | Gardner et al. | 714/814 |
| 6,876,699 B1 * | 4/2005 | Chadha et al. | 375/233 |
| 7,787,531 B2 * | 8/2010 | Porter et al. | 375/229 |
| 8,537,886 B1 * | 9/2013 | Su et al. | 375/233 |
| 8,787,439 B2 * | 7/2014 | Palusa et al. | 375/233 |
| 2001/0055319 A1 * | 12/2001 | Quigley et al. | 370/480 |
| 2002/0191684 A1 * | 12/2002 | Min et al. | 375/222 |
| 2004/0233981 A1 * | 11/2004 | Porter et al. | 375/229 |
| 2006/0088090 A1 * | 4/2006 | Azenkot et al. | 375/233 |
| 2010/0260253 A1 * | 10/2010 | Hovakimyan et al. | 375/233 |
| 2011/0131439 A1 * | 6/2011 | Renner et al. | 713/401 |
| 2014/0269890 A1 * | 9/2014 | Hoang et al. | 375/233 |

OTHER PUBLICATIONS

DOCSIS2, "Data-Over-Cable Service Interface Specifications" DOCSIS 2.0 Radio Frequency Interface Specification CM-SP-RFIv2.0-C02 Published Apr. 22, 2009 pp. 73-75.*

* cited by examiner

*Primary Examiner* — Juan A Torres
(74) *Attorney, Agent, or Firm* — Bart A. Perkins

(57) ABSTRACT

Methods, systems, and computer readable media can be operable to conditionally use feedback equalization during equalization of a signal. In embodiments, a feedback component of a receiver can be turned off during initial ranging and periodic maintenance intervals, and resulting pre-equalization coefficients can be used to pre-distort subsequent data signals at a transmitter.

20 Claims, 4 Drawing Sheets

CONDITIONAL USE OF FEEDBACK EQUALIZATION

TECHNICAL FIELD

This disclosure relates to feedback equalization.

BACKGROUND

Communication channels typically contain linear distortion(s) that affect the transmission quality of data traffic transported on the channels. Receivers in communications systems use different types of equalization to overcome channel distortion. Examples of equalization schemes include feed-forward equalization (FFE) and decision feedback equalization (DFE).

In embodiments, a receiver can send pre-equalization coefficients to each of the transmitters, wherein the pre-equalization coefficients are equivalent to the inverse of the distortion in the channel associated with each transmitter. The transmitters can use the pre-equalization coefficients to pre-distort a signal which will travel across the channel between each transmitter and the receiver. The distortion in the channel will then distort the pre-distorted signal as the signal is transported across the channel, and the signal will arrive at the receiver with a minimal amount of distortion.

The communication channel between each transmitter and receiver is unique, thus unique equalization coefficients are used for each communication channel, or each transmitter. Therefore, in systems where one receiver and multiple transmitters exist, the receiver may store the equalization coefficients that correspond to all of the multiple transmitters, and storing the equalization coefficients consumes memory.

Using feedback equalization in generating pre-equalization coefficients can become complicated. Therefore, it is desirable to improve upon methods and systems for equalizing a signal using feedback equalization.

BRIEF DESCRIPTION OF THE DRAWINGS

Like reference numbers and designations in the various drawings indicate like elements.

DETAILED DESCRIPTION

It is desirable to reduce the complexity of generating pre-equalization coefficients using feedback equalization. In embodiments, feedback equalization may include equalization of a signal that occurs after an initial equalization of the signal. For example, feedback equalization can include equalization by a feedback component of a DFE equalizer, and an initial equalization can include equalization by a feed-forward component of the DFE equalizer. In embodiments, feedback equalization can be bypassed during initial ranging and periodic maintenance intervals when pre-equalization coefficients are retrieved from a signal, and resulting pre-equalization coefficients can be used to pre-distort data signals, or transmissions, at a transmitter. The pre-distorted data signals, or transmissions, can be post-equalized using feed-forward equalization and feedback equalization (e.g., both the feedback and feed-forward components of a DFE) at the receiver.

In embodiments, feedback equalization of a signal can be bypassed based on a determination of the type of signal that is received. For example, feedback equalization of a signal can be bypassed when the received signal is a ranging signal. A ranging signal may include an initial transmission (e.g., an initial ranging signal, a regular data burst, etc.) or a station maintenance signal (e.g., a periodic ranging or periodic maintenance signal). Where feedback equalization of a ranging signal is bypassed, the accuracy of pre-equalization coefficients extracted from the ranging signal (e.g., coefficients obtained through feed-forward equalization) can be improved. Therefore, a transmitter can receive more accurate pre-equalization coefficients from a receiver in response to a ranging signal when feedback equalization of the ranging signal is bypassed.

Figure 1:
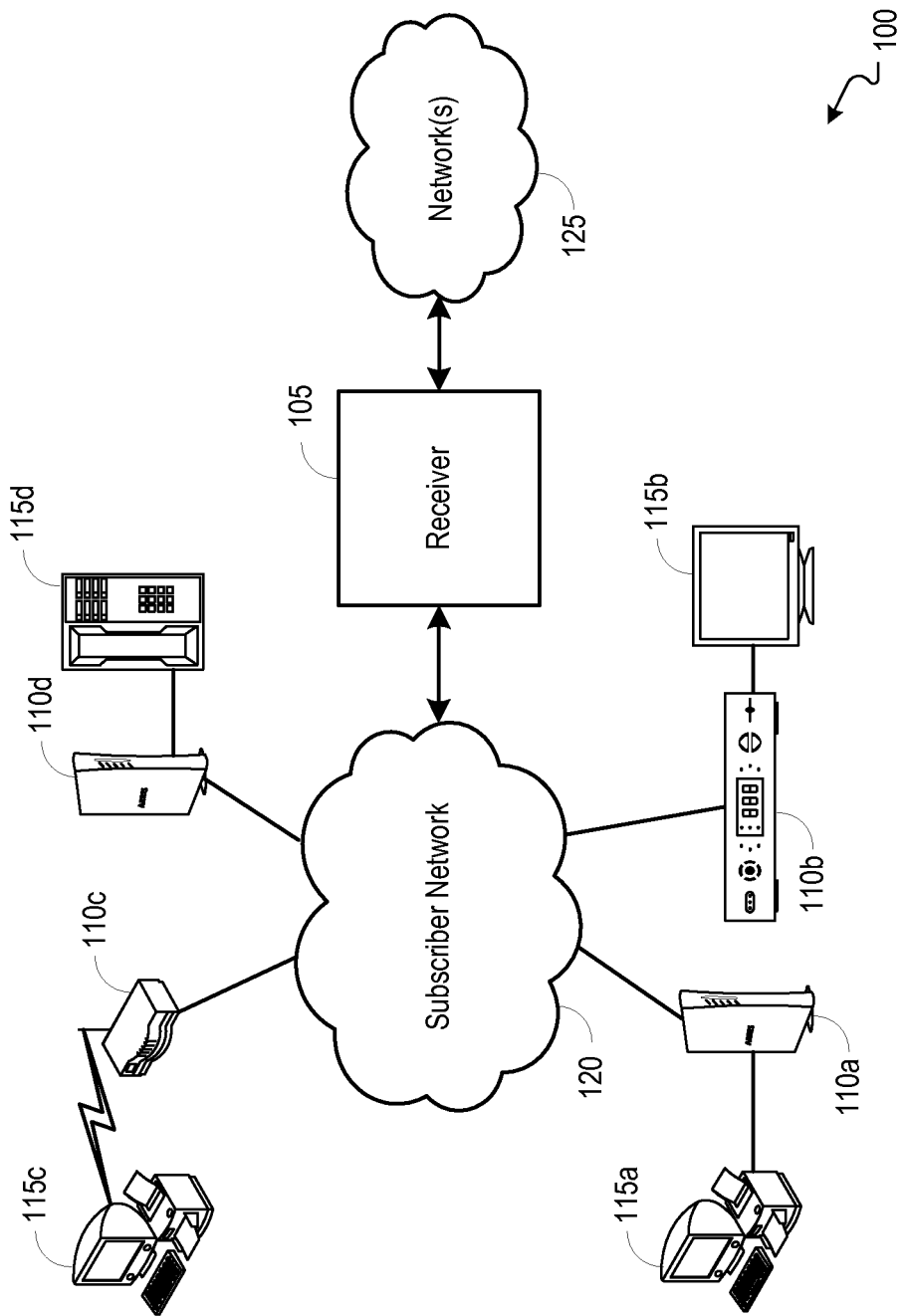
FIG. 1 is a block diagram illustrating an example network environment operable to conditionally use feedback equalization during equalization of a signal.

FIG. 1 is a block diagram illustrating an example network environment 100 operable to conditionally use feedback equalization during equalization of a signal. In embodiments, a receiver 105 can provide video service(s) and/or data service(s) to customer premise equipment (CPE) devices 110a-d in one or more subscriber groups (e.g., service group(s)). The receiver 105 can be, for example, a headend. The CPE devices can include, for example, a cable modem 110a, a set-top box 110b, a wireless router including an embedded cable modem 110c, or a media terminal adapter (MTA) 110d, among many others (e.g., digital subscriber line (DSL) modem, voice over internet protocol (VOIP) terminal adapter, video game console, digital versatile disc (DVD) player, communications device, etc.). The CPE devices can facilitate communications between the receiver 105 and client devices 115a-d. A cable modem or embedded MTA (eMTA) 110a can facilitate communications from the receiver 105 to a computer 115a. A set-top box 110b can facilitate communications from the receiver 105 to a television 115b or a digital video recorder (DVR). A wireless router 110c can facilitate wireless communications between a computer 115c and a receiver 105. An MTA 110d can facilitate communications between a telephone 115d and a receiver 105.

The CPE devices 110a-d can communicate with the receiver 105 via a subscriber network 120 (e.g., hybrid fiber-coax (HFC) network, local area network (LAN), wireless local area network (WLAN), etc.). The receiver 105 can facilitate communications between one or more network(s) 125 and the CPE devices 110a-d. In embodiments, the network(s) 125 can include one or more networks internal to the receiver and/or one or more networks external to the receiver (e.g., one or more extranets, the Internet, etc.). The network(s) 125, for example, can operate using internet protocol (IP), sending data packets to and receiving data packets from the receiver 105. In further examples, one or more video sources may provide streaming data through the network(s) 125 to the receiver 105.

In embodiments, the receiver 105 can be located at or within a cable modem termination system (CMTS), and the CMTS can separate video content into various streams or channels to be transmitted (e.g., broadcast, multicast, unicast, etc.) to the CPE devices 110a-d. For example, each of the various streams or channels can represent a specific bandwidth at a frequency associated with a specific content provider and/or network. In embodiments, the CMTS can designate one or more channels for upstream traffic (e.g., signal(s) sent from a CPE device 110a-d to the CMTS).

In embodiments, traffic on an upstream channel can be degraded by upstream impairments existing on the upstream channel. During a ranging process between a CPE device 110a-d and receiver 105, and during subsequent communications between the CPE device and receiver, the receiver can assign pre-equalization coefficients to the CPE device. For example, the pre-equalization coefficients can be based on the extent of upstream impairments existing on an associated upstream channel. In embodiments, pre-equalization coefficients can be associated with an equalizer tap in an upstream receiver. Pre-equalization coefficients can be received by a CPE device from a receiver. For example, a receiver can generate pre-equalization coefficients based upon an upstream signal received from a CPE device, and the receiver can send the pre-equalization coefficients to the CPE device via a range-response message. In embodiments, the CPE device 110a-d can use the one or more pre-equalization coefficients to pre-distort an upstream signal so that the upstream signal is corrected by the upstream impairments and arrives at the receiver 105 with a minimal level of distortion.

Figure 2:
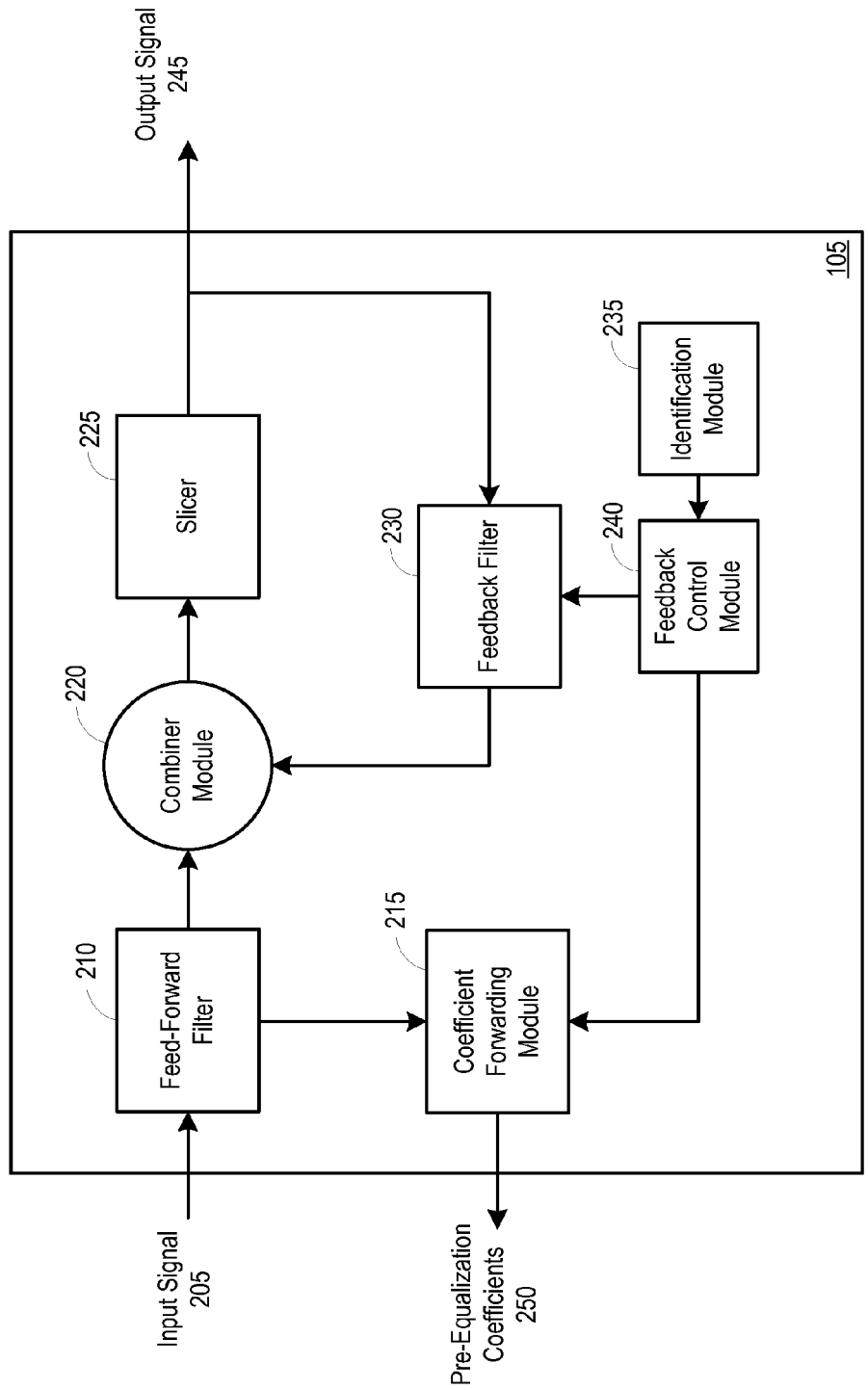
FIG. 2 is a block diagram illustrating an example receiver operable to conditionally use feedback equalization during equalization of a signal.

FIG. 2 is a block diagram illustrating an example receiver 105 operable to conditionally use feedback equalization during equalization of a signal. The receiver 105 can include a feed-forward filter 210, a coefficient forwarding module 215, a combiner module 220, a slicer 225, a feedback filter 230, an identification module 235, and a feedback control module 240. In embodiments, the receiver 105 can be located at or in a CMTS.

In embodiments, an input signal 205 can be received by the receiver 105 from a client device (e.g., CPE devices 110a-d of FIG. 1) through a network (e.g., subscriber network 120 of FIG. 1). It should be understood that in various implementations, the input signal 205 can be received by the receiver 105 through a local area network (LAN), wide area network (WAN), or other applicable network.

In embodiments, the input signal 205 can pass through a feed-forward filter 210. In embodiments, the feed-forward filter 210, coupled with a feedback filter 230, can equalize the input signal 205. When a feedback filter 230 is disconnected or bypassed, the feed-forward filter 210 can equalize the input signal 205. The feed-forward filter 210 can extract pre-equalization coefficients associated with the input signal. In embodiments, the feed-forward filter 210 can output the extracted pre-equalization coefficients to a coefficient forwarding module 215 and/or a combiner module 220. For example, the feed-forward filter 210 can output data samples that are representative of the extracted pre-equalization coefficients to a coefficient forwarding module 215 and/or a combiner module 220. In embodiments, the feed-forward filter 210 can output the equalized input signal to a combiner module 220.

In embodiments, a slicer 225 can output the equalized input signal to a destination (e.g., a destination in the network(s) 125 of FIG. 1). For example, the slicer 225 can output the equalized input signal as an output signal 245 to an upstream destination. In embodiments, the slicer 225 can output the equalized input signal to a feedback filter 230 and/or an identification module 235.

In embodiments, a feedback filter 230 can generate feedback coefficients associated with a signal that has been equalized by a feed-forward filter 210. For example, feedback coefficients generated by the feedback filter 230 can be determined based upon measurements taken at one or more taps within the feedback filter 230. In embodiments, the feedback filter 230 can output feedback coefficients to the combiner module 220. For example, the feedback filter 230 can output data samples that are representative of the feedback coefficients to a combiner module 220.

In embodiments, an identification module 235 can identify a classification of the input signal 205. The identification module 235 can receive input associated with a classification of the input signal 205, for example, from another component of the receiver 105 (e.g., slicer 225). The identification module 235 can also receive input associated with a classification of the input signal 205 from a device that is external to the receiver 105. For example, the identification module 235 can determine a classification of the input signal 205 based upon input received from a component or device within a headend or CMTS (e.g., a scheduling component). In embodiments, the identification module 235 can determine whether the input signal 205 is a ranging signal. A ranging signal may include an initial transmission (e.g., an initial ranging signal, a regular data burst, etc.) or a station maintenance signal (e.g., a periodic ranging or periodic maintenance signal). The identification module 235 can output a determined classification of the input signal 205 to a feedback control module 240.

In embodiments, a feedback control module 240 can alter or set feedback coefficients generated by the feedback filter 230. For example, where the determination is made that the input signal 205 is a ranging signal, the feedback control module 240 can set the feedback coefficients to zero. In embodiments, where the determination is made that the input signal 205 is a ranging signal, the feedback control module 240 can bypass the feedback filter 230. For example, the feedback filter can be temporarily disabled. In embodiments, the feedback control module 240 can output a command to enable or disable the coefficient forwarding module 215 based upon the classification of the input signal 205.

In embodiments, the combiner module 220 can combine data samples received from the feed-forward filter 210 and the feedback filter 230. For example, the combiner module 220 can determine the difference between feedback coefficients and corresponding feed-forward pre-equalization coefficients. The combiner module 220 can determine the difference between feedback coefficients and corresponding feed-forward coefficients based upon the difference between data samples received from the feed-forward filter 210 and the feedback filter 230.

In embodiments, the coefficient forwarding module 215 can output feed-forward coefficients (e.g., pre-equalization coefficients 250). For example, the coefficient forwarding module 215 can output pre-equalization coefficients 250 to a CPE device from which the input signal 205 was received. In embodiments, the coefficient forwarding module 215 can be enabled or disabled based upon the classification of the input signal 205. For example, the coefficient forwarding module 215 can be enabled when the input signal 205 is a ranging signal and can be disabled when the input signal 205 is not a ranging signal.

Figure 3:
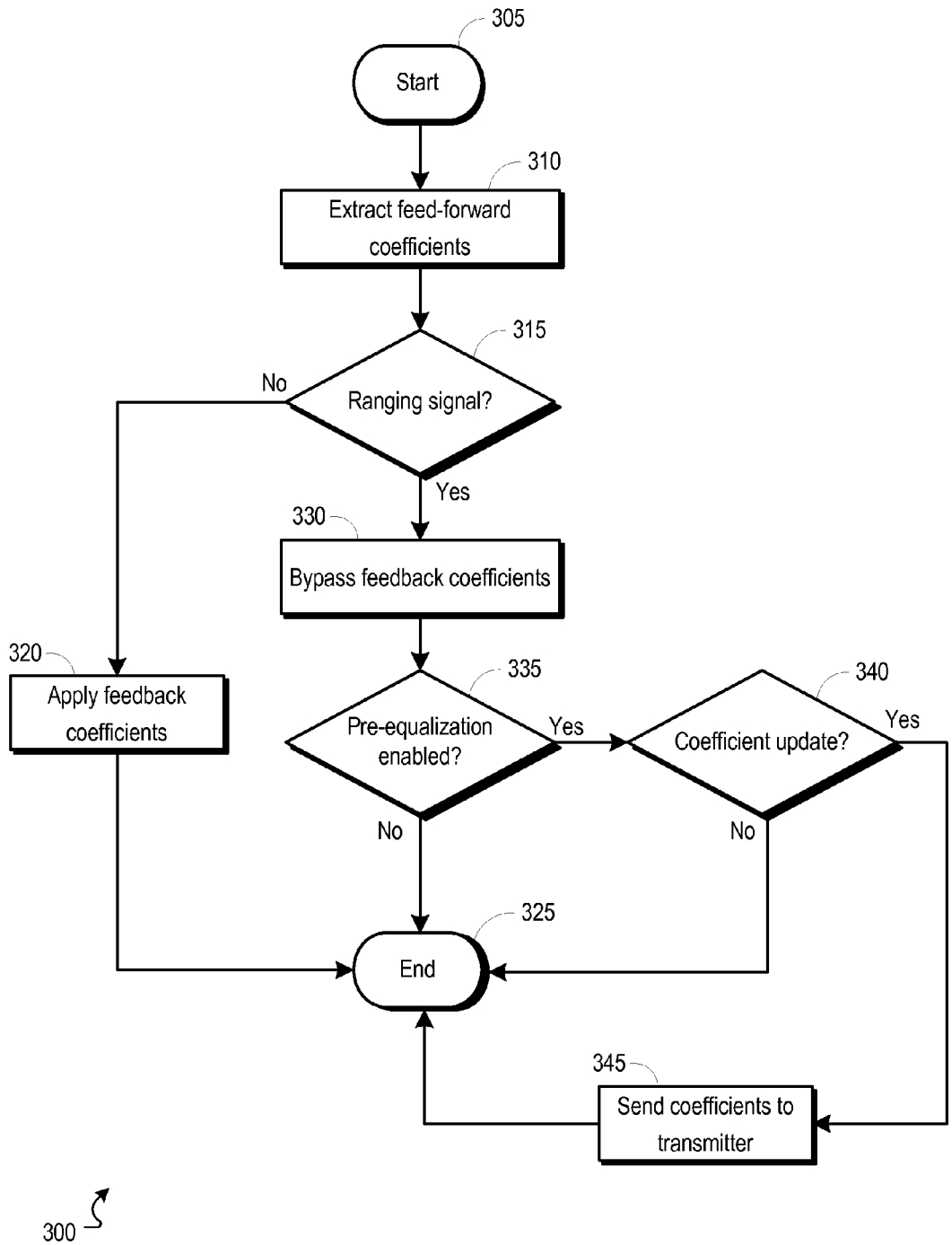
FIG. 3 is a flowchart illustrating an example process operable to conditionally use feedback equalization during equalization of a signal.

FIG. 3 is a flowchart illustrating an example process 300 operable to conditionally use feedback equalization during equalization of a signal. The process 300 can begin at 305, when a receiver receives a signal from a transmitter. For example, a CPE device 110a-d of FIG. 1 can transmit a signal to a receiver 105 of FIG. 1. In embodiments, the received signal can be a pre-equalized signal. For example, a CPE device 110a-d can use pre-equalization coefficients received from an associated receiver 105 to pre-distort a signal. The CPE device 110a-d can then transmit the pre-distorted (e.g., pre-equalized) signal to the associated receiver 105. Where the signal is a ranging signal (e.g., an initial ranging transmission, periodic ranging signal, station maintenance signal, etc.), a default set of pre-equalization coefficients can be used to pre-equalize the signal. For example, the default set of pre-equalization coefficients can include a value of one (1) at a main tap and zero(s) (0) at one or more non-main taps, and the signal can be pre-equalized at an associated CPE device 110a-d. In embodiments, the data can be transmitted to a receiver 105 as a signal that is not pre-equalized. For example, where the data is transmitted as a ranging signal, the data can be transmitted to the receiver 105 as a signal that is not pre-equalized.

At 310, feed-forward coefficients can be extracted from a received signal. Feed-forward coefficients can be extracted, for example, by a feed-forward filter (e.g., feed-forward filter 210 of FIG. 2). In embodiments, the feed-forward filter 210 can extract pre-equalization coefficients associated with the received signal.

At 315, a determination can be made whether a received signal (e.g., a signal received by a receiver 105 from a CPE device 110a-d) is a ranging signal received from a CPE device. A determination whether the received signal is a ranging signal can be made, for example, by a module within a receiver (e.g., identification module 235 of FIG. 2). For example, an identification module 235 can determine whether the received signal is a ranging signal based upon information and/or data contained in the signal (e.g., signal type identification information). In embodiments, the identification module 235 can determine whether the received signal is a ranging signal based upon information and/or data associated with the CPE device 110a-d from which the signal is received, the information and/or data being stored at a receiver 105 or at a device or component that is external to the receiver 105.

If, at 315, the determination is made that the received signal is not a ranging signal, the process 300 can proceed to 320. At 320, feedback coefficients can be used in equalization of the received signal. For example, feedback coefficients (e.g., coefficients generated by a feedback filter 230 of FIG. 2) can be combined with corresponding feed-forward coefficients (e.g., coefficients extracted from a signal by a feed-forward filter 210). Feedback coefficients can be combined with corresponding feed-forward coefficients, for example, by a combiner module 220. For example, the combiner module 220 can combine data samples received from the feed-forward filter 210 and the feedback filter 230. In embodiments, a combiner module 220 can determine the difference between feedback coefficients and corresponding feed-forward coefficients. After feedback coefficients are applied, the process 300 can end at 325.

If, at 315, the determination is made that the received signal is a ranging signal, the process 300 can proceed to 330. At 330, a feedback filter associated with the receiver can be bypassed. A feedback filter associated with the receiver can be bypassed, for example, by a feedback control module 240 of FIG. 2. For example, where the received signal is a ranging signal, the feedback control module 240 can temporarily preclude the feedback filter 230 from outputting feedback coefficients, or data samples, to the combiner module 220. In embodiments, where the received signal is a ranging signal, the feedback control module 240 can set feedback coefficients at the feedback filter 230 to zero(s).

At 335, a determination can be made whether pre-equalization is enabled at the transmitter from which the signal is received. The determination whether pre-equalization is enabled at the transmitter can be made, for example, by a coefficient forwarding module 215 of FIG. 2. In embodiments, the determination whether pre-equalization is enabled at the transmitter can be made based upon a configuration setting (e.g., pre-equalization enabled, pre-equalization disabled, etc.) associated with the transmitter. For example, configuration settings associated with a plurality of transmitters (e.g., CPE devices 110a-d of FIG. 1) can be stored at a receiver 105 or at a device or component that is external to the receiver 105 (e.g., a device or component located at a headend or CMTS), and the receiver 105 can access the configuration settings. It should be understood that the determination whether pre-equalization is enabled at the transmitter can be made based upon information carried in a response signal received by the receiver 105 from the transmitter. If the determination is made that pre-equalization is not enabled at the transmitter, the process 300 can end at 325.

If, at 335, the determination is made that pre-equalization is enabled at the transmitter, the process 300 can proceed to 340. At 340, a determination can be made whether to update pre-equalization coefficients associated with the transmitter. The determination whether to update pre-equalization coefficients associated with the transmitter can be made, for example, by a coefficient forwarding module 215 of FIG. 2. In embodiments, the determination whether to update pre-equalization coefficients can be based upon the magnitude of feed-forward coefficients (e.g., pre-equalization coefficients extracted from a signal at a feed-forward filter 210 of FIG. 2) extracted from an input signal. For example, where the magnitude of one or more non-main tap feed-forward coefficients (e.g., pre-equalization coefficient(s) extracted at one or more non-main taps of a feed-forward filter 210 of FIG. 2) is greater than a threshold magnitude (e.g., a magnitude that suggests that current pre-equalization coefficients associated with the transmitter are insufficient to counter channel distortions), the coefficient forwarding module 215 can make the determination to update pre-equalization coefficients associated with the transmitter. If the determination is made not to update pre-equalization coefficients associated with the transmitter, the process 300 can end at 325.

If, at 340, the determination is made to update pre-equalization coefficients associated with the transmitter, the process 300 can proceed to 345. At 345, updated pre-equalization coefficients can be output to the transmitter. Updated pre-equalization coefficients can be output to the transmitter, for example, by a coefficient forwarding module 215 of FIG. 2. In embodiments, feed-forward coefficients (e.g., pre-equalization coefficients extracted from an input signal at a feed-forward filter 210 of FIG. 2) can be output from a feed-forward filter 210 to a coefficient forwarding module 215, and the coefficient forwarding module 215 can output the feed-forward coefficients, as pre-equalization coefficients 250 of FIG. 2, to the transmitter. After updated pre-equalization coefficients are output to the transmitter, the process 300 can end at 325.

Figure 4:
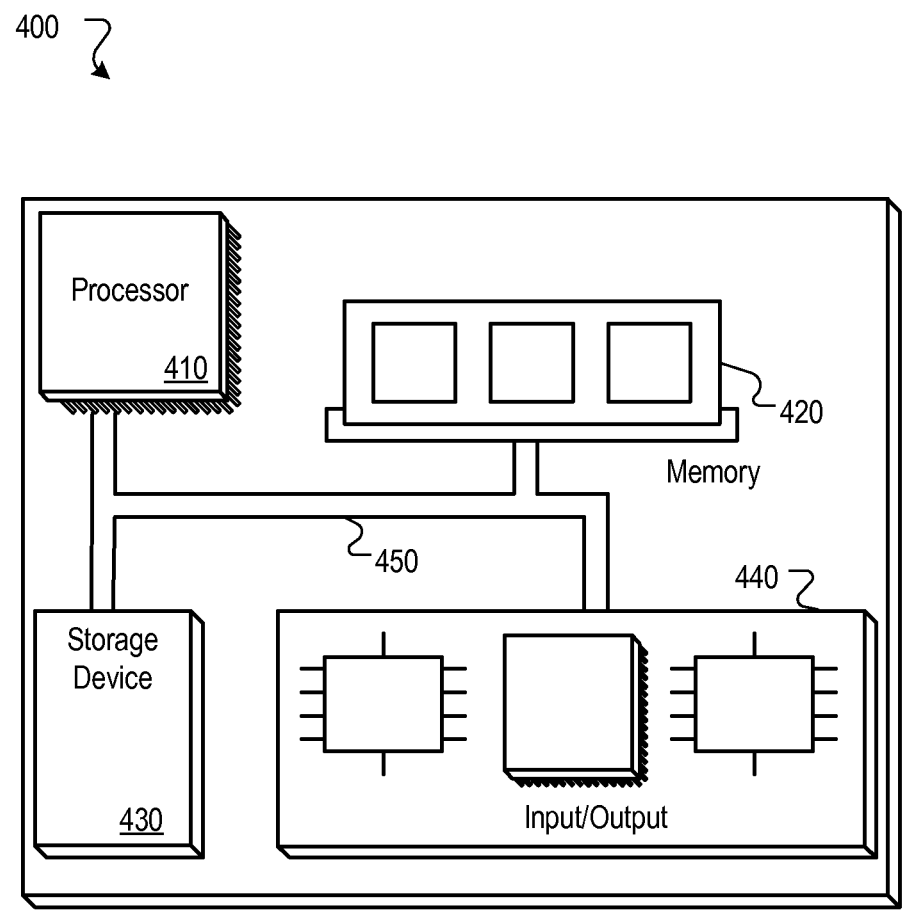
FIG. 4 is a block diagram of a hardware configuration operable to conditionally use feedback equalization during equalization of a signal.

FIG. 4 is a block diagram of a hardware configuration 400 operable to conditionally use feedback equalization during equalization of a signal. It should be understood that various types of devices can operate to conditionally use feedback equalization during equalization of a signal. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 120 of FIG. 1, network(s) 125 of FIG. 1, etc.).

Those skilled in the art will appreciate that the invention improves upon methods and apparatuses for equalizing a signal at a receiver. Moreover, the invention improves upon methods and systems for equalizing a signal using DFE at a receiver. The methods, systems, and apparatuses described in this disclosure enable the conditional use of feedback equalization during equalization of a signal. The accuracy of pre-equalization coefficients that are extracted from a ranging signal can be improved upon by the conditional use of feedback equalization.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:

receiving a signal from a transmitter;

extracting feed-forward coefficients from the signal;
performing feed-forward equalization on the signal;
determining a signal type associated with the signal;
if the determination is made that the signal type associated with the signal is a ranging signal, bypassing feedback equalization; and
if the determination is made that the signal type associated with the signal is not a ranging signal, performing feedback equalization on the signal.

2. The method of claim 1, wherein feedback equalization is bypassed if the determined signal type associated with the signal is an initial transmission or a station maintenance signal.

3. The method of claim 1, wherein bypassing feedback equalization comprises preventing a combination of the feed-forward coefficients with feedback coefficients that are associated with feedback equalization.

4. The method of claim 1, wherein bypassing feedback equalization comprises preventing a feedback filter from receiving the signal.

5. The method of claim 1, wherein bypassing the feedback filter comprises setting feedback coefficients that are associated with feedback equalization to zero.

6. The method of claim 1 further comprising:
determining whether pre-equalization is enabled at the transmitter;
determining whether pre-equalization coefficients associated with the transmitter need to be updated; and
where pre-equalization is enabled at the transmitter and pre-equalization coefficients associated with the transmitter need to be updated, outputting the feed-forward coefficients to the transmitter.

7. The method of claim 6, wherein the feed-forward coefficients comprise a main tap coefficient and a plurality of non-main tap coefficients, and wherein determining whether pre-equalization coefficients associated with the transmitter need to be updated comprises:
comparing one or more of the plurality of feed-forward, non-main tap coefficients to one or more threshold magnitudes; and
where one or more of the plurality of feed-forward, non-main tap coefficients are greater than the one or more threshold magnitudes, determining that pre-equalization coefficients associated with the transmitter need to be updated.

8. An apparatus comprising:
an input interface configured to be used to receive a signal from a transmitter;
a feed-forward filter configured to extract feed-forward coefficients from the signal;
a feed-forward module configured to perform feed-forward equalization on the signal;
an identification module configured to determine a signal type associated with the signal; and
a control module configured to:
if the signal type associated with the signal is a ranging signal, cause the signal to bypass feedback equalization; and
if the signal type associated with the signal is not a ranging signal, cause feedback equalization to be performed on the signal.

9. The apparatus of claim 8, wherein the control module is configured to bypass the feedback equalization by preventing a combination of the feed-forward coefficients with feedback coefficients that are associated with the signal.

10. The apparatus of claim 8, wherein the control module is configured to bypass the feedback equalization by preventing a feedback filter from receiving the signal.

11. The apparatus of claim 8, wherein the control module is configured to bypass the feedback equalization by setting feedback coefficients associated with the signal to zero.

12. The apparatus of claim 8, further comprising:
a forwarding module configured to determine whether pre-equalization is enabled at the transmitter, and to determine whether pre-equalization coefficients associated with the transmitter need to be updated; and
an output interface configured to be used to output the feed-forward coefficients to the transmitter where pre-equalization is enabled at the transmitter and pre-equalization coefficients associated with the transmitter need to be updated.

13. The apparatus of claim 12, wherein the feed-forward coefficients comprise a main tap coefficient and a plurality of non-main tap coefficients, and wherein the forwarding module is configured to determine whether pre-equalization coefficients associated with the transmitter need to be updated by:
comparing one or more of the plurality of feed-forward, non-main tap coefficients to one or more threshold magnitudes; and
where one or more of the plurality of feed-forward, non-main tap coefficients are greater than the one or more threshold magnitudes, determining that pre-equalization coefficients associated with the transmitter need to be updated.

14. One or more non-transitory computer readable media having instructions operable to cause one or more processors to perform the operations comprising:
receiving a signal from a transmitter;
extracting feed-forward coefficients from the signal;
performing feed-forward equalization on the signal;
determining a signal type associated with the signal;
if the determination is made that the signal type associated with the signal is a ranging signal, bypassing feedback equalization; and
if the determination is made that the signal type associated with the signal is not a ranging signal, performing feedback equalization on the signal.

15. The one or more non-transitory computer-readable media of claim 14, wherein feedback equalization is bypassed if the determined signal type associated with the signal is an initial transmission or a station maintenance signal.

16. The one or more non-transitory computer-readable media of claim 14, wherein bypassing feedback equalization comprises preventing a combination of the feed-forward coefficients with feedback coefficients that are associated with feedback equalization.

17. The one or more non-transitory computer-readable media of claim 14, wherein bypassing feedback equalization comprises preventing a feedback filter from receiving the signal.

18. The one or more non-transitory computer-readable media of claim 14, wherein bypassing the feedback filter comprises setting feedback coefficients that are associated with feedback equalization to zero.

19. The one or more non-transitory computer-readable media of claim 14, wherein the instructions are further operable to cause one or more processors to perform the operations comprising:
determining whether pre-equalization is enabled at the transmitter;
determining whether pre-equalization coefficients associated with the transmitter need to be updated; and where pre-equalization is enabled at the transmitter and pre-equalization coefficients associated with the transmitter need to be updated, outputting the feed-forward coefficients to the transmitter.

20. The one or more non-transitory computer-readable media of claim 19, wherein the feed-forward coefficients comprise a main tap coefficient and a plurality of non-main tap coefficients, and wherein determining whether pre-equalization coefficients associated with the transmitter need to be updated comprises:

comparing one or more of the plurality of feed-forward, non-main tap coefficients to one or more threshold magnitudes; and where one or more of the plurality of feed-forward, non-main tap coefficients are greater than the one or more threshold magnitudes, determining that pre-equalization coefficients associated with the transmitter need to be updated.

* * * * *